United States Patent [19]

Silverwater

[11] Patent Number: 4,823,604
[45] Date of Patent: Apr. 25, 1989

[54] PRESSURE TRANSDUCER ASSEMBLY
[75] Inventor: Bernard F. Silverwater, Plainview, N.Y.
[73] Assignee: Pall Corporation, N.Y.
[21] Appl. No.: 52,889
[22] Filed: May 22, 1987
[51] Int. Cl.[4] ............................................. G01L 9/00
[52] U.S. Cl. .................................................... 73/717
[58] Field of Search ................ 73/717, 718, 719, 720, 73/721, 722, 716, 736, 756

[56] References Cited

U.S. PATENT DOCUMENTS

| | | | |
|---|---|---|---|
| 3,060,396 | 10/1962 | Gibbs et al. | 73/720 |
| 3,085,437 | 4/1963 | Osterstrom | 73/407 |
| 3,106,095 | 10/1963 | Tavis | 73/407 |
| 3,533,293 | 10/1970 | Puckett | 73/407 |
| 3,559,488 | 2/1971 | Weaver | 73/398 |
| 3,623,371 | 11/1971 | Jullien-Davin | 73/722 |
| 4,073,191 | 2/1978 | Saigusa | 73/706 |
| 4,135,408 | 1/1979 | Di Giovanni | 73/721 |
| 4,222,277 | 9/1980 | Kurtz et al. | 73/721 |
| 4,297,891 | 11/1981 | Falcon | 73/756 |
| 4,306,460 | 12/1981 | Sakurai et al. | 73/721 |
| 4,364,276 | 12/1982 | Shimazoe et al. | 73/721 |
| 4,513,623 | 4/1985 | Kurtz et al. | 73/721 |
| 4,527,434 | 7/1985 | White | 73/720 |

Primary Examiner—Stewart J. Levy
Assistant Examiner—Robert R. Raevis
Attorney, Agent, or Firm—Leydig, Voit & Mayer

[57] ABSTRACT

The disclosed pressure transducer assembly comprises a transducer for generating electrical signals in response to differential pressures; a structure for encasing the transducer, the encasing structure including first and second ports for communicating fluids at first and second pressures to the transducer; and a housing for enveloping the casing structure with fluid having a pressure at least approximately equal to the first or second pressure, the encasing structure being removably disposed within the housing.

18 Claims, 1 Drawing Sheet

PRESSURE TRANSDUCER ASSEMBLY

TECHNICAL FIELD

The present invention relates to a pressure transducer assembly and, in particular, to a reliable and economical assembly for monitoring differential pressure.

BACKGROUND ART

A differential pressure transducer is a device which generates an electrical signal when two fluids at different pressures are applied to the device. The magnitude of the electrical signal may be proportional to the difference between the fluid pressures. For example, the magnitude of the signal may increase as the difference between the fluid pressures increases, thus providing an indication of the magnitude of the difference between the two pressures. The differential pressure transducer is typically permanently fixed within a casing which protects the transducer and channels the fluids to the transducer.

It is frequently necessary to monitor or measure the difference between two high but nearly equal fluid pressures, e.g., a first fluid pressure of 5,020 pounds per square inch (psi) and a second fluid pressure of 5,000 psi. While the difference between the two fluid pressures is small, e.g., about 20 psi, the difference between each fluid pressure inside the casing and standard atmospheric pressure, i.e., about 14.7 psi, outside the casing is very large, e.g., about 5,000 psi. Consequently, the casing must be fashioned from very heavy duty materials to prevent the fluid inside the casing from rupturing the casing. Unfortunately, a heavy duty casing is relatively expensive, so, once the differential pressure transducer permanently fixed within the casing fails, it is necessary to replace both the transducer and the expensive casing.

DISCLOSURE OF THE INVENTION

The present invention provides a pressure transducer assembly comprising a transducer which generates electrical signals in response to differences between fluid pressures and a casing which encases the transducer. The casing includes first and second ports for communicating fluids at first and second pressures to the transducer. The pressure transducer assembly further comprises a housing for enveloping the casing with fluid having a pressure equal to or approximately equal to the first or second pressure, the casing being removably disposed within the housing.

By enveloping the casing with a fluid having a pressure at least approximately equal to the first or second pressure, the difference in pressures between the inside and the outside of the casing is relatively small. Consequently, the casing may be fabricated as a thin-walled and, therefore, inexpensive structure. Of course, the housing should be rugged enough to withstand the difference between the pressure of the fluid inside the housing and atmospheric pressure outside the housing. However, the casing is removably disposed within the housing so that, when the transducer fails, the transducer and the inexpensive casing may be replaced while the housing is reused. Thus, the pressure transducer assembly according to the present invention is both reliable and economical.

BEST MODE FOR CARRYING OUT THE INVENTION

Figure 2:
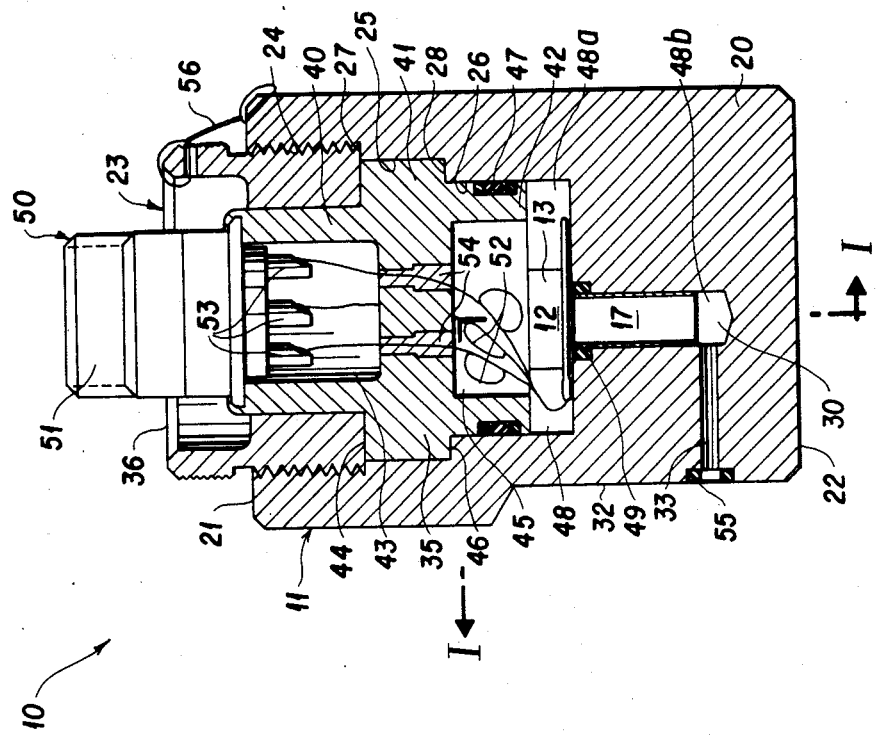
FIG. 2 is a sectional view of the exemplary pressure transducer assembly of FIG. 1 as viewed along line II—II of FIG. 1.
Figure 1:
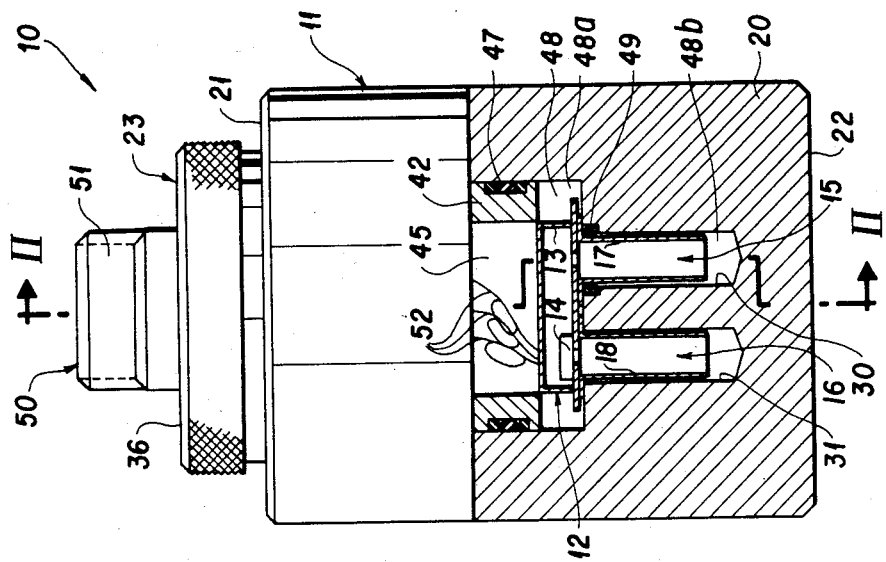
FIG. 1 is a partial sectional elevation view of an exemplary pressure transducer assembly embodying the invention as viewed along line I—I in FIG. 2.

As shown in FIGS. 1 and 2, an exemplary pressure transducer assembly 10 embodying the invention generally comprises a housing 11 and a pressure transducer 12 disposed within the housing 11. The pressure transducer 12 includes a casing 13 which encases a transducer mechanism 14. The transducer mechanism 14, which may include a diaphragm or a piezoelectric crystal, generates electrical signals in response to differences between first and second fluid pressures communicated to the transducer mechanism 14 via first and second ports 15, 16 in first and second legs 17, 18 of the casing 13.

Although any of several commonly available pressure transducers may be suitable, the pressure transducer 12 of the exemplary pressure transducer assembly 10 preferably has a casing 13 that is designed to withstand only small pressure differentials between the interior and exterior of the casing 13, e.g., a burst pressure of 200 pounds per square inch differential (psid). Consequently, the casing may be fashioned as a thin-walled structure from a light-weight material, which significantly decreases the cost of the pressure transducer 12. Such inexpensive pressure transducers are available, for example, under the trademark SENSYM from Sensym, Inc.

In accordance with one aspect of the invention, the housing of the pressure transducer assembly serves to surround or envelope the pressure transducer with fluid at a pressure equal to or approximately equal to the first or second fluid pressure communicated to the transducer mechanism. By enveloping the pressure transducer with such fluid, an inexpensive, thin-walled pressure transducer may be used to monitor relatively small pressure differentials, e.g., 20 psid, for fluids at relatively high absolute pressures, e.g., 5,000–8,000 psia. To this end, the housing may be fashioned in a variety of configurations including, for example, as a hollow conduit through which fluid flows and in which the pressure transducer is mounted.

In the exemplary pressure transducer assembly 10, the housing is fashioned as a pressure vessel from a metal, such as aluminum or an aluminum alloy. The housing 11 preferably comprises a hollow shell 20 having an open end 21 and a blind end 22 and an end cap assembly 23 mounted to and enclosing the open end 21 of the shell 20. The interior of the shell 20 preferably comprises a bore having a generally circular cross section and including upper, middle, and lower sections 24, 25, 26. The upper section 24 at the open end 21 is threaded. The middle section 25 has a reduced diameter defining a first shoulder 27, and the bottom section 26 has a still further reduced diameter defining a second shoulder 28. First and second spaced holes 30, 31 extend away from the bottom of the bore toward the blind end 22.

The exterior of the shell 20 also preferably has a generally circular cross section. However, a flat 32 may be formed on the exterior of the shell 20 to facilitate mounting the exemplary pressure transducer assembly 10 to a fluid system (not shown) for which a differential pressure is to be monitored or measured. First 33 and second (not shown) spaced openings extend from the flat 32 to the first and second holes 30, 31, respectively, and serve to channel fluid between the exterior and the interior of the shell 20.

The end cap assembly 23 of the housing 11 preferably has a two-piece construction comprising a cap 35 and a mounting ring 36. The cap 35, which is disposed within the interior of the shell 20, also has a generally circular cross section and includes upper, middle, and lower sections 40, 41, 42. The upper section 40 includes a central bore 43 and has an outer diameter less than the diameter of the upper section 24 of the interior of the shell 20.

The middle section 41 of the cap 35 has a diameter and an axial extent corresponding to those of the middle section 25 of the interior of the shell 20. In addition, the middle section 41 of the cap 35 has a diameter greater than that of the upper section 40 of the cap 35, defining a first shoulder 44 on the cap 35 which is just slightly above the first shoulder 27 of the shell 20.

The lower section 42 of the cap 35 also includes a central bore 45. The outside diameter of the lower section 42 of the cap 35 corresponds to the diameter of the lower section 26 of the interior of the shell 20 and, therefore, is smaller than the diameter of the middle section 41 of the cap 35, defining a second shoulder 46 on the cap 35. The second shoulder 46 on the cap 35 abuts the second shoulder 28 of the shell 20. The axial extent of the lower section 42 of the cap 35 is less than that of the lower section 26 of the interior of the shell 20 but sufficient to just contact the top of the pressure transducer 12 at the corners of the casing 13.

The lower section 42 of the cap 35 also has a circumferential groove containing a seal 47, preferably an O-ring with auxiliary flat rings above and below the O-ring, which engages the lower section 26 of the interior of the shell 20. The central bore 45 in the lower section 42 of the cap 35, the lower section 26 of the interior of the shell 20 below the lower section 42 of the cap 35, and the first and second holes 30, 31 together form an enclosed chamber 48. The pressure transducer 12 is disposed within the chamber 48 which is isolated from the exterior of the housing 11 by the seal 47 between the cap 35 and the shell 20. A seal 49, such as an O-ring, may be disposed between the housing 11 and the pressure transducer 12, e.g., in the first, hole 30, to divide the chamber 48 into high and low pressure portions 48a, 48b.

The mounting ring 36 has an outside diameter which is comparable to the diameter of the upper section 24 of the interior of the shell 20 and is correspondingly threaded. The inside diameter of the mounting ring 36 is slightly greater than the diameter of the upper section 40 of the cap 35, and, therefore, when the mounting ring 36 is tightened to the shell 20, the bottom of the mounting ring 36 abuts the first shoulder 44 of the cap 35, maintaining the cap 35 between the bottom of the mounting ring 36 and the second shoulder 28 of the shell 20.

In addition to the housing 11 and the pressure transducer 12, the exemplary pressure transducer assembly 10 further comprises an electrical arrangement 50 for communicating the electrical signals generated by the transducer mechanism 14 to the exterior of the housing 11. In the exemplary pressure transducer assembly 10, the electrical arrangement 50 includes a connector 51 mounted to the upper section 40 of the cap 35 and several wire leads 52 interconnecting the transducer mechanism 14 and the connector 51. The connector 51 may comprise, for example, any suitable plug or terminal for connecting the exemplary pressure transducer assembly 10 to an electrical system (not shown) for displaying or recording the electrical signals corresponding to the differential pressures.

The connector 51 of the exemplary-pressure transducer assembly 10 has three terminals 53 which extend into the central bore 43 in the upper section 40 of the cap 35 and are connected to the wire leads 52. The wire leads 52, in turn, extend through holes in the middle section 41 of the cap 35 into the central bore 45 in the lower section 42 of the cap 35. The wire leads 52 are connected to the pressure transducer 12, for example, by a soldered connection. The holes in the middle section 41 of the cap 35 are filled with a sealant 54, such as an epoxy resin, to prevent fluid from leaking from the interior of the housing 11. While in the exemplary pressure transducer assembly 10 the pressure transducer 12 is coupled to the connector 51 by wire leads 52, an alternative coupling mechanism, such as a magnetic coupling mechanism, may be used to avoid placing holes in the middle section 41 of the cap 35.

In the preferred mode of operation, the connector 51 may be attached to the electrical system (not shown) and the exemplary pressure transducer assembly 10 may be mounted to the fluid system (not shown), preferably with the first and second openings 33, (not shown) respectively coupled to low and high pressure taps (not shown). For example, the pressure taps may be taken from areas downstream and upstream from a flow obstruction assembly or a filter across which differential pressure is to be determined.

Once the exemplary pressure transducer assembly 10 is mounted to the fluid system (not shown), the low pressure fluid passes from the low pressure tap, through the first opening 33, and into the low pressure portion 48b of the chamber 48. At the same time, the high pressure fluid passes from the high pressure tap, through the second opening (not shown), and into the high pressure portion 48a of the chamber 48. Seals 55, such as O-rings, prevent leakage of fluid from between the exemplary pressure transducer assembly 10 and the fluid system (not shown). The seal 47 between the cap 35 and the shell 20 and the sealant 54 in the middle section 41 of the cap 35 prevent leakage of the high pressure fluid from the high pressure portion 48a of the chamber 48.

From the low pressure portion 48b of the chamber 48, the low pressure fluid passes through the first port 15 in the first leg 17 of the pressure transducer 12 and into the upper portion of the casing 13 where it bears against one surface of the transducer mechanism 14. From the high pressure portion 48a of the chamber 48, the high pressure fluid passes through the second port 16 in the second leg 18 of the pressure transducer 12 where it bears against an opposite surface of the transducer mechanism 14. The transducer mechanism 14 then generates an electrical signal corresponding to the pressure differential between the high and low pressure fluids. This electrical signal is communicated to the electrical system (not shown) via the wire leads 52 and the connector 51.

The housing 11 thus completely envelopes the pressure transducer 12 by fluid at pressures equal to or approximately equal to the pressures of the low and high pressure fluids. The maximum difference in pressure between the interior and the exterior of the casing 13 is essentially the pressure differential between the high pressure fluid surrounding the upper portion of the casing 13 and the low pressure fluid within the upper portion of the casing 13. Since this pressure differential may be relatively small, an inexpensive pressure transducer with a thin-walled casing may be used to monitor pressure differential for fluids even at very high nominal pressures.

In accordance with another aspect of the invention, the exemplary pressure transducer assembly 10 may be quickly and conveniently disassembled to allow replacement of the pressure transducer 12. Failure of the pressure transducer 12, for example, due to pressure surges or fluid shock, may be minimized by properly locating the pressure taps in the fluid system or by the installation of a surge or shock suppression apparatus. However, in the event that the pressure transducer 12 does fail, it can be replaced by depressurizing the fluid system and then simply unscrewing the mounting ring 36 from the upper section 24 of the shell 20. The cap 35 and the pressure transducer 12, which is connected to the cap 35 via the wire leads 52, are then removed from the interior of the shell 20 by sliding them through the opened end 21.

Once the failed pressure transducer 12 has been detached from the wire leads 52, a new pressure transducer 12 may be attached to the wire leads 52, e.g., by soldering. The pressure transducer 12 and the cap 35 are then replaced by sliding them into the interior of the shell 20. The first and second legs 17, 18 of the pressure transducer 12 slide into the first and second holes 30, 31 in the shell 20, the first leg 17 fitting through the seal 49. The cap 35 slides into the interior of the shell 20 until the second shoulder 46 of the cap 35 abuts the second shoulder 28 of the shell 20. The wire leads 52 gather in the bore 45.

With the cap 35 and the pressure transducer 12 in place, the mounting ring 36 is screwed to the shell 20 and tightened against the first shoulder 44 of the cap 35. A lock wire 56 may be strung between the mounting ring 36 and the shell 20 to ensure that the mounting ring 36 does not inadvertently become loose. Thus, according to the invention, the inexpensive pressure transducer 12 may be repeatedly replaced as necessary, while the housing 11 is continually reused.

The present invention has been described in terms of a particular embodiment. However, it is not limited to this embodiment. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention.

I claim:

1. A pressure transducer assembly comprising transducer means for generating electrical signals in response to differential pressures; means for encasing the transducer means, the encasing means including first and second means for respectively communicating fluids at first and second pressures to the transducer means; and housing means for enveloping the encasing means with first and second fluids having a pressure at least approximately equal to the first or second pressure, the encasing means being removably disposed within the housing means.

2. The pressure transducer assembly of claim 1 wherein the housing means includes a hollow shell having an open end and a blind end and end cap means for enclosing the open end of the shell, the shell and the end cap means defining a chamber, and wherein the encasing means is removably disposed within the chamber.

3. The pressure transducer assembly of claim 2 wherein the end cap means includes a cap slidably insertable within the interior of the shell and a mounting ring abuttable against the cap and releasably mountable to the shell.

4. The pressure transducer assembly of claim 2 further comprising an electrical connector mounted to the end cap means and means for communicating to the connector the electrical signals generated by the transducer means.

5. The pressure transducer assembly of claim 4 wherein the end cap means includes means defining a hole and the signal communicating means includes a wire lead extending from the transducer means through the hole to the connector, the hole being filled with a sealant.

6. The pressure transducer assembly of claim 2 wherein the chamber includes a first portion for containing fluid at the first pressure and a second portion for containing fluid at the second pressure and wherein the encasing means is disposed in the chamber with the first communicating means communicating with the first portion of the chamber and the second communicating means communicating with the second portion of the chamber.

7. The pressure transducer assembly of claim 6 wherein the shell includes first and second openings respectively communicating with the first and second portions of the chamber.

8. The pressure transducer assembly of claim 1 wherein the housing means includes a housing for withstanding fluids having a pressure as great as about 8,000 psia.

9. A pressure transducer assembly comprising a housing defining an enclosed chamber and having first and second openings respectively communicating first and second fluids at first and second pressures with the chamber; a pressure transducer disposed within the chamber, the pressure transducer including transducer means for generating electrical signals in response to differential pressures and a casing surrounding the transducer means and enveloped by the first and second fluids having a pressure at least approximately equal to the first or second pressure, the casing having first and second means for respectively communicating the first and second fluids to the transducer means; and sealing means operatively associated with the housing and the pressure transducer for dividing the chamber into a first portion fluidly communicating with the first opening of the housing and with the first means of the casing and a second portion fluidly communicating with the second opening of the housing and the second means of the casing.

10. The pressure transducer assembly of claim 9 wherein the housing is capable of withstanding fluids having a pressure as great as about 8,000 psia.

11. A pressure transducer assembly comprising a housing including a hollow shell having an open end and a blind end; an end cap assembly detachably mounted to the open end of the shell and including a cap sealed against the interior of the shell and spaced from the blind end of the shell to define an enclosed chamber and further including a mounting ring threaded to the open end of the shell and abutting the cap, the hollow shell further having first and second openings respectively communicating first and second fluids at first and second pressures with the chamber; an electrical connector mounted to the cap; a pressure transducer disposed within the enclosed chamber and enveloped by the first and second fluids having a pressure at least approximately equal to the first or second pressure, the pressure transducer including transducer means for generating electrical signals in response to differential pressures and means for communicating the electrical signals to the electrical connector; and a seal positioned between the pressure transducer and the housing and dividing the enclosed chamber into a first portion fluidly communicating with the first opening and a second portion fluidly communicating with the second opening.

12. The pressure transducer assembly of claim 11 wherein the shell, end cap assembly, and mounting ring are capable of withstanding fluids having a pressure as great as about 8,000 psia.

13. A pressure transducer assembly comprising a shell including an open end, a blind end, and a bore which extends from the open end into the shell and has a threaded first bore section at the open end of the shell, a second bore section adjacent to the first bore section, and a third bore section adjacent to the second bore section and having a smaller diameter than the second bore section defining a shell shoulder, the shell further including first and second holes extending from the third bore section toward the blind end and first and second openings respectively communicating first and second fluids at first and second pressures with the first and second holes; a cap including a first cap section disposed within and having a smaller diameter than the first bore section, a second cap section disposed within the second bore section and having a larger diameter than the first cap section defining a first cap shoulder, and a third cap section disposed within the third bore section and having a smaller diameter than the second cap section defining a second cap shoulder which is disposed against the shell shoulder; a seal disposed between the shell and the cap to define an enclosed chamber between the shell and the cap, the enclosed chamber including the first and second holes; a mounting ring threaded to the first bore section and disposed around the first cap section and against the first cap shoulder; a pressure transducer disposed within the chamber and enveloped by first and second fluids having a pressure at least approximately equal to the first or second pressure, the pressure transducer including a transducer element for generating electrical signals in response to differential pressure and a casing surrounding the transducer element and having first and second means for communicating first and second pressures to the transducer element, the first and second communicating means including first and second legs respectively disposed in the first and second holes in the shell; a second seal disposed between the pressure transducer and the shell for dividing the enclosed chamber into a first portion fluidly communicating with the first opening in the shell and with the first communicating means of the casing and a second portion fluidly communicating with the second opening in the shell and with the second communicating means of the casing; and an electrical arrangement for communicating the electrical signals generated by the pressure transducer to the exterior of the shell, the electrical arrangement including a connector mounted to the first section of the cap and at least one wire lead extending from the pressure transducer to the connector, the cap having at least one hole through which the wire lead extends and a sealant which fills the hole around the wire lead.

14. The pressure transducer assembly of claim 13 wherein the first bore section has a larger diameter than the second bore section.

15. The pressure transducer assembly of claim 13 wherein the seal is disposed between the shell and the third cap section.

16. The pressure transducer assembly of claim 13 wherein the seal arrangement is disposed between the shell and the second leg of the casing.

17. The pressure transducer assembly of claim 13 wherein the exterior of the shell includes a flat containing the first and second openings.

18. The pressure transducer assembly of claim 13 wherein the third cap section abuts the casing of the pressure transducer.

* * * * *